Aug. 7, 1934.　　　P. McDONALD　　　1,969,141
DEEP WELL PRESSURE GAUGE
Filed March 17, 1932
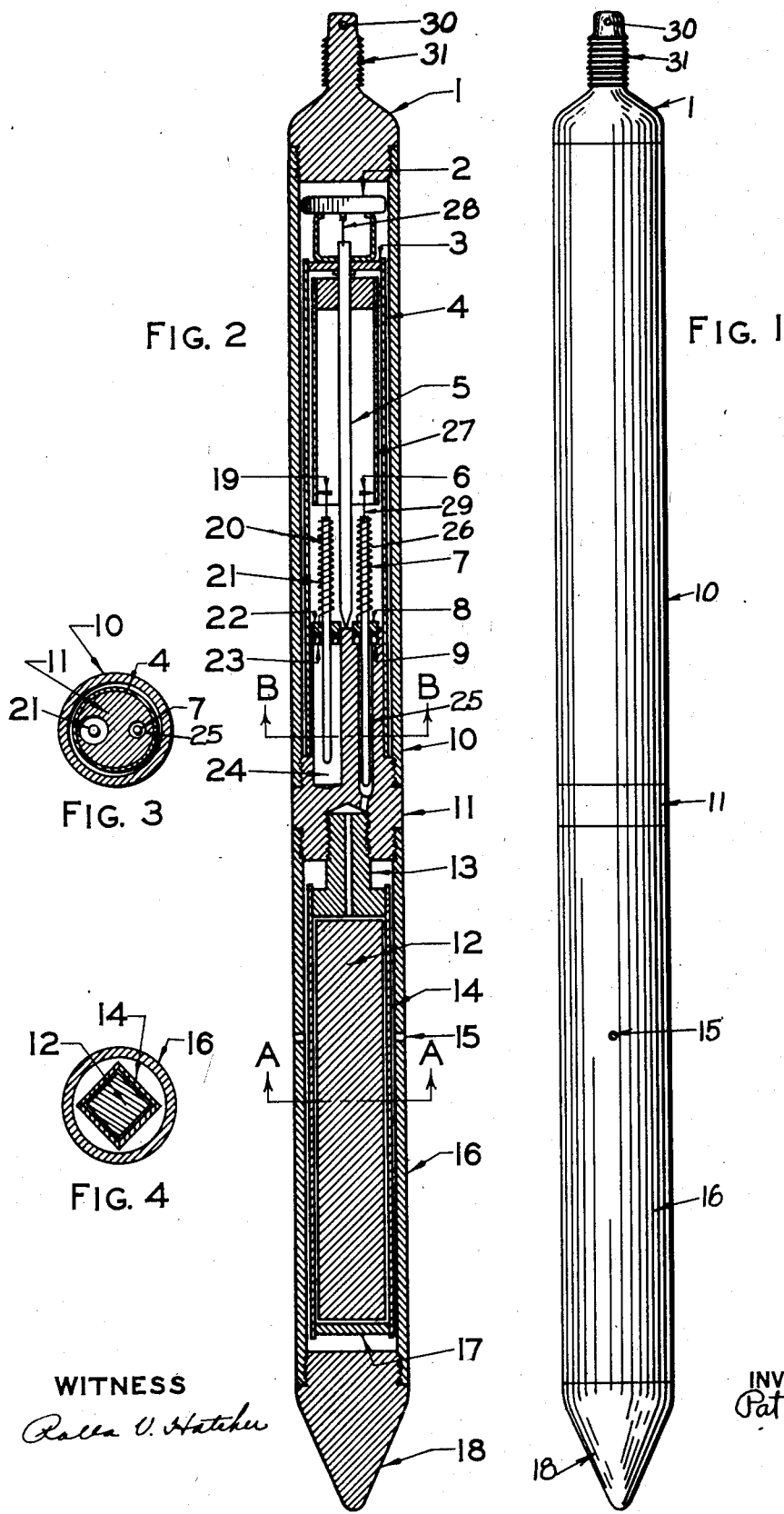
WITNESS
Rolla V. Hatcher
INVENTOR
Pat McDonald Patented Aug. 7, 1934

1,969,141

UNITED STATES PATENT OFFICE 1,969,141

DEEP WELL PRESSURE GAUGE

Pat McDonald, Bartlesville, Okla., assignor of one-half to Indian Territory Illuminating Oil Company, a corporation of Delaware Application March 17, 1932, Serial No. 599,519

3 Claims. (Cl. 73—5)

This invention has to do with the art of deep well pressure gauges for use in obtaining bottom hole pressures in bore holes.

In its preferred embodiment the invention is a self-contained instrument comprising means for measuring and recording magnitudes of pressures and furnishing an accurate, permanent record of these data.

To fully explain the advantages of my invention I shall refer briefly to the operation of common types of pressure gauges. The common type of pressure gauge utilizes the slight circular movement of a coiled "Bourdon" tube when pressure is applied internally or externally. The motion is so slight that various means must be used to amplify this motion as it is too small to permit direct reading with any degree of accuracy. The use of any mechanical amplifying linkage obviously has its disadvantages. The "Bourdon" tube type also requires a moderately large diameter case or container. The type of gauge for use in obtaining bottom hole pressures in bore holes must be of small diameter, with length but a minor consideration. It must be accurate and not affected by the jars it will receive while being lowered or in being raised from the bore hole, and should record the pressures continuously so that these data may be determined at any depth or under any condition of flow. The instrument should be of an adjustable nature so that any reasonable range of pressures may be measured.

With the foregoing in view, this invention provides a means of transferring the flexure of a straight hollow tube under pressure to a straight line motion of a plunger which in turn records the magnitude of the pressure upon a chart inserted on the inside of a drum revolved by a small clockworks. This is accomplished by pressure transfer by means of a fluid and means are provided so that the pressure plunger will not be displaced by changes in volume of the fluid due to temperature changes.

The temperatures are obtained by allowing the expansion or contraction of a fluid due to temperature changes to displace a plunger and the record is obtained in the same manner as that of the pressure plunger. The gauge is of such a diameter that it may be run in a bore of less than two inches in diameter.

While this instrument may be particularly useful in conjunction with the continuous recording mechanism, it may be easily adapted to a surface gauge in which the readings are made visually, by leaving off the recording mechanism. By removing the plunger 7 and filling the chamber completely full of a fluid and permitting the fluid to spill over as the pressure increases, the measurement of the volume displaced will be a measure of the maximum pressure. Since no mechanical linkage of any kind is required the gauge will tend to remain absolutely accurate and be more reliable than the common type of pressure gauges.

Special means for these purposes have been devised and combined, all of which will now be described in detail with reference to the accompanying drawing, in which:

Figure 1 is a general view in side elevation of the instrument as completely assembled.

Figure 2 is a general view in side elevation showing a cross section of the instrument taken through the center line of Figure 1.

Figure 3 is a general and fragmentary view showing in a plan view a cross section taken through BB of Fig. 2.

Figure 4 is a general and fragmentary view showing in plan view a cross section taken through AA of Fig. 2 in which a pressure tube of rectangular cross section has been utilized.

*General construction*

The shell or case of the instrument is constructed of tubing and the ends of the instrument are of streamlined construction so that it may be lowered against the well flow if necessary. Part 16 is perforated by the hole 15 so that the well pressure may enter 16 and be in contact with the tube 14, the walls of which will flex slightly when subjected to external pressure. The tube is closed at the lower end by the plug 17 and at the upper end by 13 and is assembled with part 11 which also acts as a coupling for 16 and 10. The space inside the tube 14 is partially occupied by the solid billet of low expansion alloy steel 12 and the remaining space is filled with a fluid such as mercury. A hole is bored in 13 into the chamber 25 bored in 11 and partially occupied by the cylindrical plunger 7. The space on the inside of these parts is completely filled with mercury or other suitable fluid. The plunger is packed off by means of a flexible cup 9 molded in the shape as shown. The stuffing box follower 8 holds the cup 9 in place and provides an anchor for one end of a coil spring 26 that is sleeved over the plunger and has its other end fixed to the upper end thereof to normally retain the plunger in retracted position so that it may be displaced upward when the volume of the lower tube 14 is decreased by external pressure. The cylindrical tube 4 is fastened rigidly to 11 by countersunk screws. Part 3 is fastened to 4 by a small screw and is removable. Part 5 is a shaft fitting freely through 3, resting on 11 and around which a cylindrical hollow drum 27 is rigidly fastened. A paper chart is placed on the inside of the drum which is revolved by the clockworks 2. The clockworks is fastened rigidly to 3 and is linked to the drum shaft 5 by a flat strip 28 which fits into a slot in the shaft when the recording mechanism is assembled. A pen or pencil 6 is fastened to plunger 7 by means of a flexible steel strip 29 and is used for making a mark on the chart which is placed inside of the revolving drum. The tube 10, enclosed at the upper end by 1. screws over 11 and protects the recording mechanism from the well pressure. A hole 30 is drilled as shown to which a wire line may be fastened for lowering into the bore hole. Part 1 is also notched as shown at 31 so that in the event the instrument is dropped in the hole the use of common oil well fishing tools for recovering it may be facilitated.

A hole 24 is bored into 11 and the space is completely filled with a liquid such as mercury and a cylindrical plunger 21 is immersed in the fluid. The packing cup 23 and the packing cup follower 22 are similar to 9 and 8 respectively. The plunger is also provided with a spring 20 having one end anchored to the follower 22 and its other end to the plunger to normally retain the plunger in retracted position in the bore 24. The expansion or contraction of the fluid in 24 due to temperature changes actuates the plunger 21 and a record of the movement is made on the chart by the pen or pencil 19.

*General operation of the machine*

The supporting bearing 3 is removed from the shell 4 and the clock 2 is taken off. The drum 27 is then removed and a chart is placed within the drum and the drum, bearing and clockworks are replaced. The pens or pencils 6 and 19 start leaving a mark when the clockwork 2 is started. The two marking pens or pencils may be of different colors so that they may be easily distinguished. The temperature of the instrument is noted and the tubing 10 with the top 1 is tightly screwed to 11. The instrument is then lowered to the point where pressures and temperature data are desired. The pressure enters through the hole 15 in the lower shell 16 and flexes the walls of the tube 14. The amount of the flexure will be proportional to the magnitude of the pressure. When pressure flexes the tube inwardly the volume of the tube is changed and the fluid in the tube is displaced through the hole in 13 and moves the plunger 7 and the pen 6 marks the chart in the drum. When the pressure is relieved the walls of 14 return to their original position as the unit stress does not exceed the elastic limit of the material of which it is made. The walls of the tube 14 return to the unstressed position when the pressure is relieved and the plunger 7 and pen or pencil 6 returns to its original position aided by the spring 26.

The volume of the fluid within the tube 14 will change with changes in temperature as will the tube 14. If the magnitudes of these expansions are equal there will be no movement of the plunger 7 due to temperature variation. An equilization is obtained in the following manner: The billet 12 of a low expansion alloy is shaped to fit loosely in the tube 14 and is made small enough to permit, without restriction, the slight flexure of the walls of the tube when pressure is applied. The volume of the tube 14 will increase with increasing temperature but will not expand as much as a similar volume of mercury or other fluid. The billet 12 will expand much less than either the tube 14 or the fluid. The billet 12 is made of such size that the expansion of the fluid plus the slight expansion of the billet will just equal the expansion of the tube 14.

With any change in temperature of the instrument there will be a change in the volume of the fluid in 24. An increase in temperature will cause the fluid to expand and displace the plunger 21 upward and the pen or pencil 19 will record the change on the chart on the drum 27. With a decrease in temperature the volume of the fluid will contract and the plunger will be lowered. The spring 20 attached to the plunger prevents any lag and overcomes the slight friction of the stuffing box.

The instrument is calibrated in the laboratory for both temperature and pressure so that the distances the plungers move may be converted to units of pressure and to units of temperature.

Having thus described the invention, what is claimed is:

1. A deep well pressure gauge including a housing having separate interior compartments and a port opening to one of said compartments, a casing in the ported compartment having a flexible wall portion inset from the housing to provide a space for well fluid admitted to said compartment through said port for acting on said wall portion, a fluid charge in said casing, means in the casing for balancing volumetric expansion of the fluid charge with volumetric capacity of the casing upon temperature change of the well fluid, means in the casing forming a chamber connected with said casing and sealed from the second compartment, a plunger extending into said chamber responsive to movement of fluid transferred from the casing to said chamber in response to variation in pressure of the well fluid on said wall portion, and means in the second chamber and connected with the plunger for recording pressure of the well fluid.

2. A deep well pressure gauge including a housing having separate interior compartments and having a port opening to one of the compartments for admitting well fluid to the compartment, a casing having a flexible wall portion in the ported compartment dimensioned to provide a space for the well fluid admitted to said compartment, a core in said casing of a material having a different coefficient of expansion than that of the casing, a fluid charge in said casing surrounding the core, means in the casing forming a chamber connected with the casing and sealed from the second compartment for receiving liquid displaced from said casing in response to pressure of the well fluid acting thereon, a plunger extending into said chamber responsive to movement of the displaced fluid, means in the second compartment for indicating pressure fluctuation, and means connecting the plunger with said indicating means.

3. A deep well pressure gauge including a casing having separate interior compartments and having a port opening to one of said compartments for admitting well fluid to the compartment, a casing having a flexible wall portion in the ported compartment dimensioned to provide a space for said well fluid, a core in said casing of a material having different coefficient of expansion than that of the casing wall and dimensioned to provide a space for a fluid charge within the casing, a fluid charge in said space, a drum in the second compartment, means for rotating the drum at a constant speed, means in the casing forming a chamber sealed from the second compartment and connected with the space in said casing, a plunger extending into said chamber responsive to said pressure from fluid transferred to the chamber from said casing in response to variation in pressure imposed on the wall of said casing by fluid admitted to the first named compartment through the port in said housing, and means on the plunger for recording on a blank carried by said drum.

PAT McDONALD.